(12) United States Patent
Seo

(10) Patent No.: US 6,727,960 B2
(45) Date of Patent: *Apr. 27, 2004

(54) TELEVISION CHANNEL SELECTION METHOD AND APPARATUS

(75) Inventor: Young-joo Seo, Suwon (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,916

(22) Filed: Jul. 15, 1998

(65) Prior Publication Data

US 2002/0167609 A1 Nov. 14, 2002

(30) Foreign Application Priority Data

Jul. 25, 1997 (KR) .......................................... 97-34850
Jul. 28, 1997 (KR) .......................................... 97-35439

(51) Int. Cl.$^7$ .......................... H04N 5/50; H04N 5/445
(52) U.S. Cl. ..................... 348/731; 348/385.1; 348/556; 348/555; 348/558; 348/570
(58) Field of Search .............................. 348/385.1, 563, 348/564, 569, 570, 609, 731, 732, 555, 556, 558; 725/40; H04N 5/50, 5/445

(56) References Cited

U.S. PATENT DOCUMENTS

| 5,475,442 | A | * | 12/1995 | Matusushita et al. | ....... 348/554 |
|---|---|---|---|---|---|
| 5,485,221 | A | * | 1/1996 | Banker et al. | .............. 348/563 |
| 5,557,337 | A | * | 9/1996 | Scarpa | ........................ 348/558 |
| 5,926,230 | A | * | 7/1999 | Niijima et al. | .............. 348/564 |
| 5,949,476 | A | * | 9/1999 | Pocock et al. | .............. 348/385 |
| 6,014,178 | A | * | 1/2000 | Jeon et al. | ................... 348/554 |
| 6,075,569 | A | * | 6/2000 | Lee et al. | .................... 348/554 |
| 6,118,493 | A | * | 9/2000 | Duhault et al. | ............. 348/561 |
| 6,177,951 | B1 | * | 1/2001 | Ghosh | ........................ 348/192 |
| 6,262,770 | B1 | * | 7/2001 | Boyce et al. | .......... 375/240.16 |

* cited by examiner

Primary Examiner—Michael H. Lee
Assistant Examiner—Brian Yenke
(74) Attorney, Agent, or Firm—Staas & Halsey LLP

(57) ABSTRACT

A channel selection method for simultaneously displaying video data of a plurality of virtual channels of one channel in the form of still images, in SD format broadcasting according to an ATV standard, and displaying video data of one of the virtual channels which corresponds to a cursor position in the form of a moving image, allowing easy selection of a desired channel from the displayed screen. A channel selection apparatus includes elements of a typical ATV system, i.e., an antenna, a tuner, an IF module, a channel decoder and a TS decoder. Also, the apparatus includes a memory to store video data separated from the broadcasting signals of four virtual channels received by the TS decoder, a video decoder to decode the stored video data and restore the decoded video data, a format converter to convert the format of the restored video data of each of the virtual channels to a screen size divided into four equal portions, a display for simultaneously display the video data of each of the format-converted channel broadcastings on one screen, and a host processor for controlling the operation of the elements to simultaneously display the broadcasting signals of the four virtual channels and full-screen display the channel selected using an input unit from the simultaneously displayed broadcasting signals of the four sub-screens.

24 Claims, 3 Drawing Sheets

TELEVISION CHANNEL SELECTION METHOD AND APPARATUS

CROSS-REFERENCE TO RELATED APPLICATIONS

This application claims the benefit of Korean Application Nos. 97-34850, filed Jul. 25, 1997 and 97-35439, filed Jul. 28, 1997, in the Korean Patent Office, the disclosure of which are incorporated herein by reference.

BACKGROUND OF THE INVENTION

1. Field of the Invention

The present invention relates to a channel selection method and apparatus of a television (TV) system, and more particularly, to a channel selection method of an advanced television (ATV) system in which a plurality of virtual channels existing in one channel during standard definition (SD) format broadcasting according to the ATV standards are simultaneously displayed on one screen, to allow easier selection of a desired virtual channel, and to a channel selection apparatus.

2. Description of the Related Art

Recently, an ATV system corresponding to a high definition television (HDTV) system which is a TV system having improved performance employing digital signal processing, is being developed as a next-generation TV. The SD format broadcasting related to the ATV system has four virtual channels of various broadcasting programs for each channel. That is, in the SD format broadcasting of a broadcasting station, for example, four broadcasting programs can be multiplexed and transferred through virtual channels 11-1, 11-2, 11-3 and 11-4 related to a channel 11. However, only one of the four virtual channels is selected and displayed on a screen of a receiver.

Four virtual channels existing per channel in the SD format broadcasting cannot be simultaneously displayed on one screen at one time, and only one selected channel can be displayed on one screen at one time, so that in order to select and determine a desired broadcasting channel, each of the virtual channels must be selected and displayed on the screen, and then it must be determined whether the displayed channel is a desired, broadcasting program or not.

SUMMARY OF THE INVENTION

To solve the above problems, it is an object of the present invention to provide a channel selection method in which four virtual channel broadcastings are simultaneously displayed on one screen-in an SD format broadcasting of an ATV system, to easily select a desired one from the four virtual channel broadcastings.

It is another object of the present invention to provide a channel selection method in which four virtual channel broadcastings are simultaneously displayed on one screen in the form of still images and the broadcasting of a selected channel is displayed in the form of a moving image, in an SD format broadcasting of an ATV system, to easily select a desired one from the four virtual channel broadcastings.

It is still another object of the present invention to provide a channel selection apparatus in which four virtual channel broadcastings are simultaneously displayed on one screen in an SD format broadcasting of an ATV system, to easily select a desired one from the four virtual channel broadcastings.

It is yet another object of the present invention to provide a channel selection apparatus in which four virtual channel broadcastings are simultaneously displayed on one screen in the form of still images and broadcasting of a selected channel is displayed in the form of a moving image, in an SD format broadcasting of an ATV system, to easily select a desired one from the four virtual channel broadcastings.

Accordingly, to achieve the above and other objects of the present invention, a channel selection method in virtual channel broadcasting defined by an SD format of an ATV system includes the steps of: a) simultaneously displaying a plurality of virtual channel broadcasting signals contained in a received channel broadcasting signal on one screen, if the broadcasting of the received channel is an SD format broadcasting; b) selecting a desired one from the plurality of displayed virtual channel broadcasting signals; and c) displaying the broadcasting signal of the selected virtual channel on a full screen.

Preferably, the step a) includes the substeps of: a1) storing video data separated from the plurality of received virtual channel broadcasting signals in a memory; a2) format-converting the stored video data to the screen size divided into equal portions; and a3) simultaneously displaying the format-converted video data on the equal portions into which the screen is divided.

It is also preferable that the step a3) includes the substeps of: a31) displaying the format-converted video data in the form of still images; and a32) displaying the image where a cursor is located in the form of a moving image.

To achieve the above and other objects of the present invention, a channel selection apparatus in virtual channel broadcasting defined by an SD format of an ATV system includes a host processor which controls the operation of each element of the channel selection apparatus according to the reception of a broadcasting signal and a channel selection of a user; a transfer stream (TS) decoder which separates video data of a plurality of virtual channel broadcasting signals contained in the received channel broadcasting signal and outputs the separated video data, if the received channel broadcasting is an SD format broadcasting; a memory which stores the video data separated by the TS decoder; a video decoder which restores video data of each of the virtual channels stored in the memory; a format converter which converts the format of the video data restored by the video decoder into a screen size divided into equal portions; a display which simultaneously displays the format-converted video data of each of the virtual channels on one screen; and an input unit which allows the selection of a desired one of the displayed broadcasting signals of each of the virtual channels.

Preferably, the input unit moves a cursor on the screen to allow the selection of a desired broadcasting signal.

Preferably, the video decoder reads video data of the virtual channels stored in the memory, to restore the read video data in the form of still images, and restore video data of a virtual channel selected by the input unit in the form of a moving image, under the control of the host processor.

It is further preferable that the video decoder restores the video data corresponding to a cursor position on the screen under control of the host processor in the form of a moving image.

According to another aspect of the present invention, a channel selection apparatus in virtual channel broadcasting defined by an SD format of an ATV system includes: a host processor which controls the operation of each element of the channel selection apparatus according to the reception of a broadcasting signal and a channel selection of a user; a transfer stream (TS) decoder which separates video data of a plurality of virtual channel broadcasting signals contained in the received channel broadcasting signal and outputs the separated video data, if the received channel broadcasting is an SD format broadcasting; a video decoder which restores the video data of each of the virtual channels output from the TS decoder; a memory which stores the restored video data; a format converter which converts the format of the video data restored by the video decoder into a screen size divided into equal portions; a display which simultaneously displays the format-converted video data of each of the virtual channels on one screen; and an input unit which allows the selection of a desired one of the displayed broadcasting signals of each of the virtual channels.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
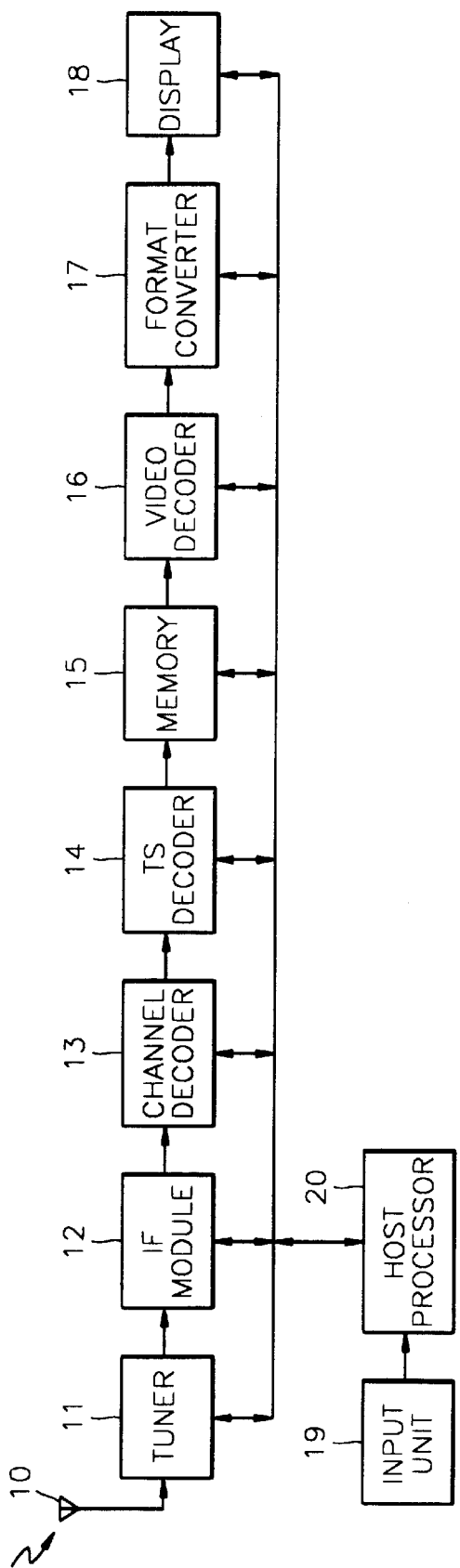
FIG. 1 is a block diagram of an advanced television (ATV) system according to an embodiment of the present invention.
Figure 2:
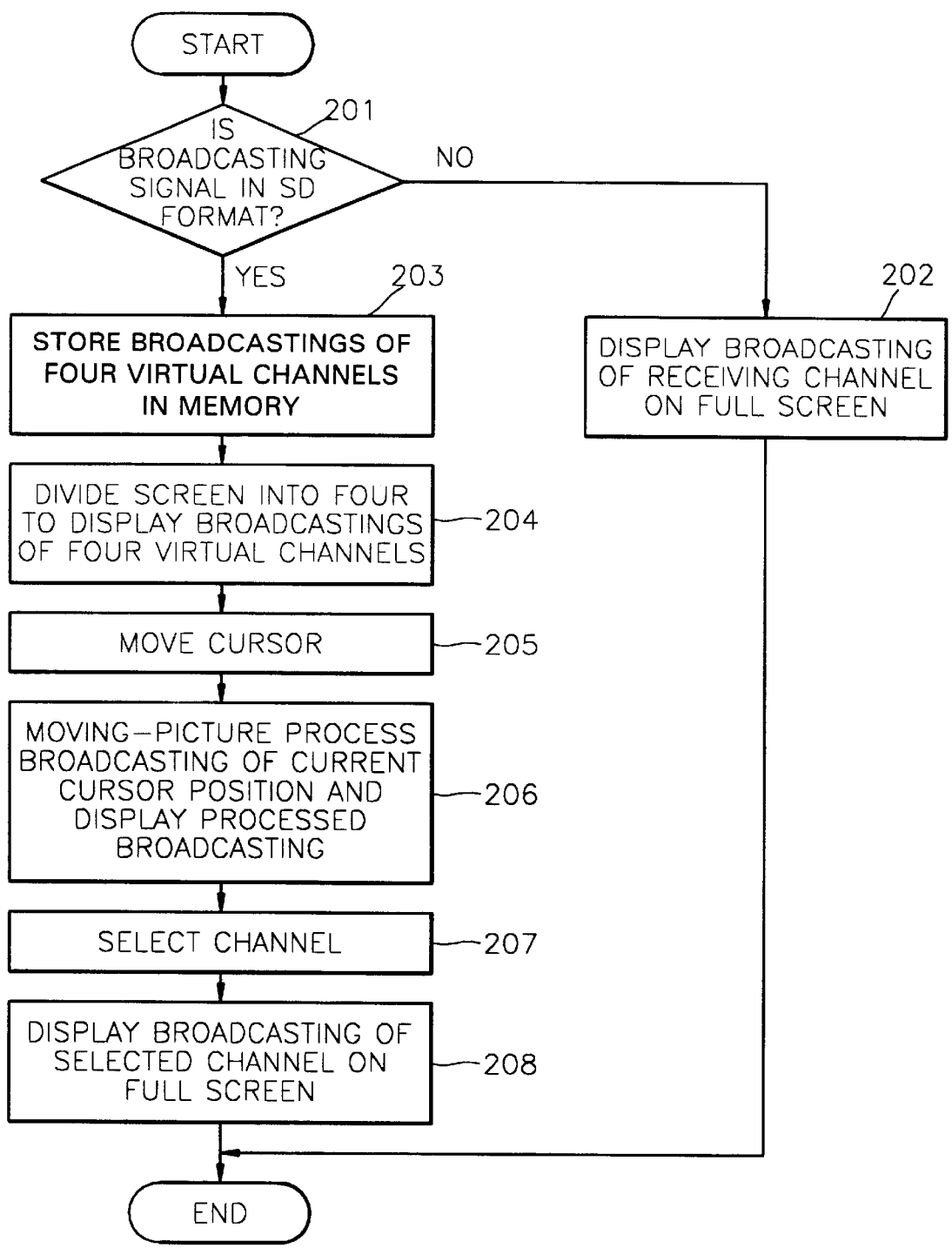
FIG. 2 is a flowchart illustrating a channel selection method of the ATV system of FIG. 1.

An ATV system of according to an embodiment of the present invention includes an antenna 10, a tuner 11, an intermediate frequency (IF) module 12, a channel decoder 13, and a transfer stream (TS) decoder 14, which are elements of a typical ATV system capable of receiving a digital broadcasting signal. Also, the ATV system includes a memory 15 for storing video data separated from four virtual channel broadcasting signals received by the TS decoder 14, a video decoder 16 for decoding the stored video data to restore the decoded video data, a format converter 17 for format-converting the video data of the restored virtual channel to meet with a screen size divided into four equal portions, a display 18 for simultaneously displaying video data of each of the format-converted channel broadcastings, and a host processor 20 for controlling operation of each of the above elements in order to simultaneously display broadcasting signals of the four virtual channels, and display on the full screen one of the four displayed broadcasting signals, selected by a user through an input unit 19. Operation of a channel selection apparatus of the ATV system according to the embodiment of the present invention will be described with reference to FIGS. 2 and 3.

In the virtual channel defined by the SD format of the ATV system, four different broadcasting programs are multiplexed into one channel. The tuner 11 selects a broadcasting signal of a predetermined channel received through the antenna 10 and outputs the selected broadcasting signal to the IF module 12. The IF module 12 converts the selected broadcasting signal to an intermediate frequency (IF) signal and outputs the converted IF signal to the channel decoder 13. At this time, the host processor 20 checks whether the received broadcasting signal of a predetermined channel is an SD format broadcasting (step 201). As a result, if the broadcasting signal is not an SD format broadcasting, the host processor 20 controls the operation of the elements to display the broadcasting signal of a received channel on the display 18 (step 202). The channel decoder 13 channel-decodes the applied IF signal to demodulate the channel-decoded IF signal to the state before modulation, and the TS decoder 14 separates video data, audio data and additional data multi-processed in the demodulated signal. The video data separated by the TS decoder 14 is stored in the memory 15. Then, the video decoder 16 reads out the video data stored in the memory 15 and restores the read video data. The format converter 17 format-converts the restored video data to a predetermined display standard and supplies the format-converted video data to the display 18. The display 18 displays the format-converted video data on the full screen, to allow a user to view the broadcasting.

Meanwhile, in step 201, if the received broadcasting signal of a predetermined channel is an SD format broadcasting, the host processor 20 controls the operation of the elements to simultaneously display four virtual channel broadcastings on one screen. That is, the TS decoder 14 stores the video data of the four virtual channel broadcasting signals of the received broadcasting signal in the memory 15 (step 203). The video decoder 16 reads out the video data of the virtual channels stored in the memory 15 and restores the read video data in the form of a still image per frame unit. The format converter 17 format-converts the still image data of each of the restored virtual channels appropriately for the screen of the display 18 divided into four equal portions. The display 18 simultaneously displays the still image data of each of the virtual channels format-converted to the screen size divided into four equal portions, on one screen as shown in FIG. 3.

Figure 3:
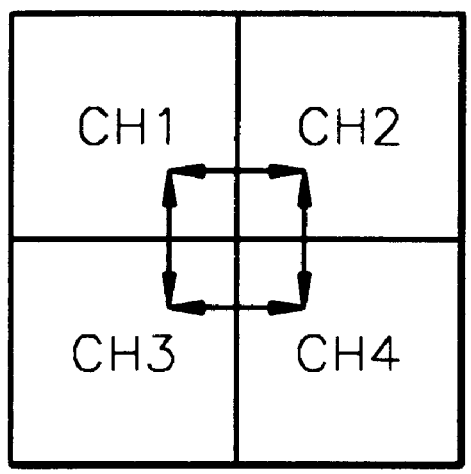
FIG. 3 is a diagram showing a screen of the display of FIG. 1.

In performing step 204 of displaying the still image data of each of the channels format-converted to the screen size divided into four equal portions is completed, broadcasting signals of the four virtual channels CH1, CH2, CH3 and CH4 in the form of still images are displayed on the display as shown in FIG. 3. A cursor located on the screen of the display 18 moves in a predetermined sequence or arbitrarily on the screen of the display through operation of the input unit 19 such as a remote controller or a keypad, and at the same time the broadcasting screen where the cursor is located is output (step 205). If the cursor does not move for a predetermined time, the host processor 20 controls the elements to display the broadcasting signal of the channel corresponding to the current position of the cursor in the form of a moving image on the display (step 206). In step 206, the video decoder 16 reads video data of a screen of the display 18 where the cursor is located from the video data of each of the virtual channels stored in the memory 15 and restores the read video data in the form of a moving image. The format converter 17 format-converts the restored moving image data to the size of the screen divided into four equal portions, and then displays the converted data on the screen of the display where the cursor is currently located. A user selects a desired channel watching the screen of the display 18 obtained through the above process (step 207). The host processor 20 controls operation of each of the elements according to the channel selection of the user, to display the broadcasting signal of the selected channel on the full screen of the display 18 (step 208).

In the step 208, the TS decoder 14 separates video data, audio data and additional data corresponding to the channel selected by the user from the received broadcasting signals, and stores the video data in the memory 15. The video decoder 16 reads the video data stored in the memory 15 and restores the read video data. The format converter 17 format-converts the video data restored by the video decoder 16 to a predetermined display standard and supplies the converted video data to the display 18. The display 18 displays the video data on the full screen.

The present invention is not limited to the case in which the SD format of the ATV system standard has four virtual channels per channel. Also, the memory 15 in the channel selection apparatus of the above-describe embodiment of the present invention is located between the TS decoder 14 and the video decoder 16. The memory 15 may be located in parallel with the video decoder 16 such that video data restored by the video decoder 16 is stored. At this time, the video decoder 16 stores the video data restored under the control of the host processor 20 in the memory 15, and reads the stored video data from the memory 15.

As described above, according to the SD format broadcasting of the ATV system of the present invention, the channel selection method and apparatus simultaneously display the screen corresponding to the cursor position in the form of a moving image, and the broadcasting signals of the other virtual channels as still images on the screen, allowing easy selection of a desired broadcasting channel from the displayed screen.

What is claimed is:

1. A channel selection method in virtual channel broadcasting defined by a standard definition (SD) format of an advanced television (ATV) system, comprising the steps of:
   a) determining whether a received broadcasting signal of a predetermined channel is an SD format broadcasting, and if so, simultaneously displaying a plurality of virtual channel broadcasting signals contained in a received channel broadcasting signal on one screen;
   b) selecting a desired one from the plurality of displayed virtual channel broadcasting signals; and
   c) displaying the broadcasting signal of the selected virtual channel on a full portion of the screen.

2. The method of claim 1, wherein said step a) comprises the substeps of:
   a1) storing video data separated from the plurality of received virtual channel broadcasting signals in a memory;
   a2) format-converting the stored video data to a size of the screen divided into equal portions; and
   a3) simultaneously displaying the format-converted video data on the equal portions into which the screen is divided.

3. The method of claim 2, wherein said step a3) comprises the substeps of:
   a31) displaying the format-converted video data in a form of still images; and
   a32) displaying an image of the format-converted video data of one of the equal portions where a cursor is located in a form of a moving image.

4. The method of claim 1, wherein said step a) comprises the substeps of:
   a1) separating video data of the plurality of received virtual broadcasting signals from the received channel;
   a2) format-converting the separated video data to a size of the screen divided in a plurality of portions corresponding to the plurality of received virtual broadcasting signals; and
   a3) simultaneously displaying the format-converted video data on the plurality of portions into which the screen is divided.

5. The method of claim 4, wherein said step a3) comprises the substeps of:
   a31) displaying the format-converted video data in a form of still images; and
   a32) displaying an image of the format-converted video data of one of the plurality of portions where a cursor is located in a form of a moving image.

6. The method of claim 1, wherein said step a) comprises the substeps of:
   a1) determining whether the broadcasting of the received channel is an SD format broadcasting;
   a2) separating video data of the plurality of received virtual broadcasting signals from the received channel, if the broadcasting of the received channel is the SD format broadcasting;
   a3) format-converting the separated video data to a size of the screen divided in a plurality of portions corresponding to the plurality of received virtual broadcasting signals, if the broadcasting of the received channel is the SD format broadcasting;
   a4) simultaneously displaying the format-converted video data on the plurality of portions into which the screen is divided, if the broadcasting of the received channel is the SD format broadcasting;
   a5) separating video data from the received channel, if the broadcasting of the received channel is not the SD format broadcasting; and
   a6) displaying the video data separated in said step a5) on the full size of the screen, if the broadcasting of the received channel is not the SD format broadcasting.

7. The method of claim 1, wherein said step a) comprises the substeps of:
   a1) separating video data of the plurality of received virtual broadcasting signals from the received channel;
   a2) storing the separated video data;
   a3) restoring the stored video data of the plurality of received virtual broadcasting signals from the received channel in a form of a still image per frame unit;
   a4) format-converting the restored video data to a size of the screen divided in a plurality of portions corresponding to the plurality of received virtual broadcasting signals; and
   a5) simultaneously displaying the format-converted video data on the plurality of portions into which the screen is divided.

8. The method of claim 1, wherein step a) comprises the substeps of:
   a1) separating video of the plurality of received virtual broadcasting signals from the received channel in a form of a still image per unit frame;
   a3) storing the restored video data;
   a4) format-converting the stored video data to a size of the screen divided in a plurality of portions corresponding to the plurality of received virtual broadcasting signals; and
   a5) simultaneously displaying the format-converted video data on the plurality of portions into which the screen is divided.

9. A channel selection method in virtual channel broadcasting defined by a standard definition (SD) format of an advanced television (ATV) system, comprising the steps of:
   a) simultaneously displaying a plurality of virtual channel broadcasting signals contained in a received channel broadcasting signal on one screen, if the broadcasting of the received channel is an SD format broadcasting, wherein said step a) comprises the substeps of:
      a1) separating video data of the plurality of received virtual broadcasting signals from the received channel,
      a2) format-converting the separated video data to a size of the screen divided in a plurality of portions corresponding to the plurality of received virtual broadcasting signals, and a3) simultaneously displaying the format-converted video data on the plurality of portions into which the screen is divided, wherein said step a3) comprises the substeps of:

a31) displaying the format-converted video data in a form of still images; and a32) determining whether a cursor is located in one of the plurality of portions for a predetermined amount of time; and a33) displaying an image of the format-converted video data of the one portion where the cursor is located in a form of a moving image, if the cursor is located in the one portion for the predetermined amount of time;

b) selecting a desired one from the plurality of displayed virtual channel broadcasting signals; and c) displaying the broadcasting signal of the selected virtual channel on a full portion of the screen.

10. A channel selection apparatus in virtual channel broadcasting defined by a standard definition (SD) format of an advanced television (ATV) system, comprising:

tuner to select reception of a channel broadcasting signal;

a transfer stream (TS) decoder which separates video data of a plurality of virtual channel broadcasting signals of respective virtual channels contained in the received channel broadcasting signal and outputs the separated video data, if the received channel broadcasting signal is determined to be an SD format broadcasting;

a memory which stores the video data separated by the TS decoder;

a video decoder which restores the separated video data of the virtual channel broadcasting signals of each of the virtual channels stored in the memory;

a format converter which converts a format of the video data restored by the video decoder into a size of a screen divided into a predetermined number of portions;

a display which simultaneously displays the format-converted video data of the virtual channel broadcasting signals of each of the virtual channels on the screen;

an input unit which enables selection of a desired one of the displayed virtual channel broadcasting signals of the virtual channels; and a host processor which controls operation of the TS decoder, memory, video decoder, format converter and display according to the selection of the displayed virtual channel broadcasting signal broadcasting signal.

11. The apparatus of claim 10, wherein the input unit moves a cursor on the screen to enables the selection of the desired one virtual channel broadcasting signal.

12. The apparatus of claim 11, wherein the video decoder reads the video data of the virtual channel broadcasting signals of the virtual channels stored in the memory, to restore the read video data in a form of still images, and restore video data of the desired one virtual channel broadcasting signal selected by the input unit in a form of a moving image, under control of the host processor.

13. The apparatus of claim 12, wherein the video decoder restores the video data corresponding to a position of the curser on the screen under control of the host processor in the form of the moving image.

14. The apparatus of claim 10, wherein each of the predetermined number of portions are of equal size to each other.

15. A channel selection apparatus in virtual channel broadcasting defined by a standard definition (SD) format of an advanced (ATV) system, comprising:

a tuner to select reception of a channel broadcasting signal;

a transfer stream (TS) decoder which separates video data of a plurality of virtual channel broadcasting signals of respective virtual channels contained in the received channel broadcasting signal and outputs the separated video data, if the received channel broadcasting signal is determined to be an SD format broadcasting;

a video decoder which restores the separated video data of the virtual channel broadcasting signals of each of the virtual channels output from the TS decoder;

a memory which stores the restored video data;

a format converter which converts a format of the video data restored by the video decoder into a size of a screen divided into a predetermined number of portions;

a display which simultaneously displays the format-converted video data of the virtual channel broadcasting signals of each of the virtual channels on the screen; and input unit which enables the selection of a desired one of the displayed virtual channel broadcasting signals of the virtual channels; and a host processor which controls operation of the TS decoder, memory, video decoder, format converter and display according to the selection of the displayed virtual channel broadcasting signal broadcasting signal.

16. The apparatus of claim 15, wherein the input unit enables the selection of the desired one virtual channel broadcasting signal by moving a cursor on the screen.

17. The apparatus of claim 16, wherein the video decoder reads the video data of the virtual channel broadcasting signals of the virtual channels stored in the memory, to restore the read video data in a form of still images, and the video data of the desired one virtual channel broadcasting signal selected by the input unit in a form of a moving image, under control of the host processor.

18. The apparatus of claim 17, wherein the video decoder restores the video data corresponding to a position of the cursor on the screen under control of the host processor in the form of the moving image.

19. The apparatus of claim 15, wherein each of the predetermined number of portions are of equal size to each other.

20. A channel selection apparatus to receive and display broadcasting channels on a display screen, comprising:

a tuner to select one of the broadcasting channels; and a processing circuit to separate and simultaneously display a plurality of virtual channel broadcasting signals contained in the selected broadcasting channel on the display screen, enable selection of one of the plurality of virtual channel broadcasting signals, determine whether a received broadcasting signal of a predetermined channel is a standard definition (SD) format broadcasting, and subsequently displaying the selected one virtual channel broadcasting signal on a full size of the display screen, if the selected broadcasting channel is a standard definition (SD) format.

21. The channel selection apparatus of claim 20, wherein said processing circuit determines whether the selected broadcasting channel is of the SD format, and displays the selected broadcasting channel on the full size of the display screen if the selected broadcasting channel is not of the SD format.

22. The channel selection apparatus of claim 20, wherein said processing circuit comprises:
- a transfer stream (TS) decoder to separate video data of the plurality of virtual channel broadcasting signals;
- a video decoder to restore the separated video data of the virtual channel broadcasting signals;
- a format converter to convert a format of the restored video data into the full size of the display screen divided into a plurality of portions;
- an input unit to enable selection of the one virtual channel broadcasting signal by a user; and
- a processor to control operation of said TS decoder, video decoder and format converter based upon the selection by the user through said input unit.

23. The channel selection apparatus as claimed in claim 22, wherein said processor controls said video decoder to restore the separated video data of the virtual channel broadcasting signals in a form a still image per unit frame to simultaneously display the plurality of virtual channel broadcasting signals on the display screen, determines an indicator of one of the plurality of virtual channel broadcasting signals simultaneously displayed, controls said video decoder to restore the video of the indicated one virtual channel broadcasting signal in a form of a moving image to display the indicated one virtual channel broadcasting signal as the moving image in the corresponding portion of the display screen which simultaneously displays the plurality of virtual channel broadcasting signals, and controls said format convert to convert a format of the selected one virtual channel broadcasting signal selected by the user to display the selected one virtual channel broadcasting signal on the full size of the display screen.

24. The channel selection apparatus as claimed in claim 23, wherein the indicator is a cursor positioned in one of the plurality of portions of the screen for a predetermined amount of time.

* * * * *

UNITED STATES PATENT AND TRADEMARK OFFICE
CERTIFICATE OF CORRECTION

PATENT NO. : 6,727,960 B2
DATED : April 27, 2004
INVENTOR(S) : Young-Joo Seo

It is certified that error appears in the above-identified patent and that said Letters Patent is hereby corrected as shown below:

Column 6,
Line 43, insert -- a -- before "video"
Line 44, after "channel" insert --;
   a2)restoring the video data of the plurality of received virtual broadcasting signals from the received channel --.

Column 7,
Line 24, insert -- a -- before "tuner"
Line 50, change "broadcasting signal broadcasting signal" to -- broadcasting signal --
Line 52, change "enables" to -- enable --.

Column 8,
Line 24, insert -- an -- before "input"
Line 27, insert -- a -- before "host"
Line 30, change "broadcasting signal broadcasting signal" to -- broadcasting signal --.

Signed and Sealed this

Twenty-eighth Day of September, 2004

JON W. DUDAS
*Director of the United States Patent and Trademark Office*